(No Model.)
C. C. BOYKIN.
PEANUT PLANTER.
No. 301,664. Patented July 8, 1884.
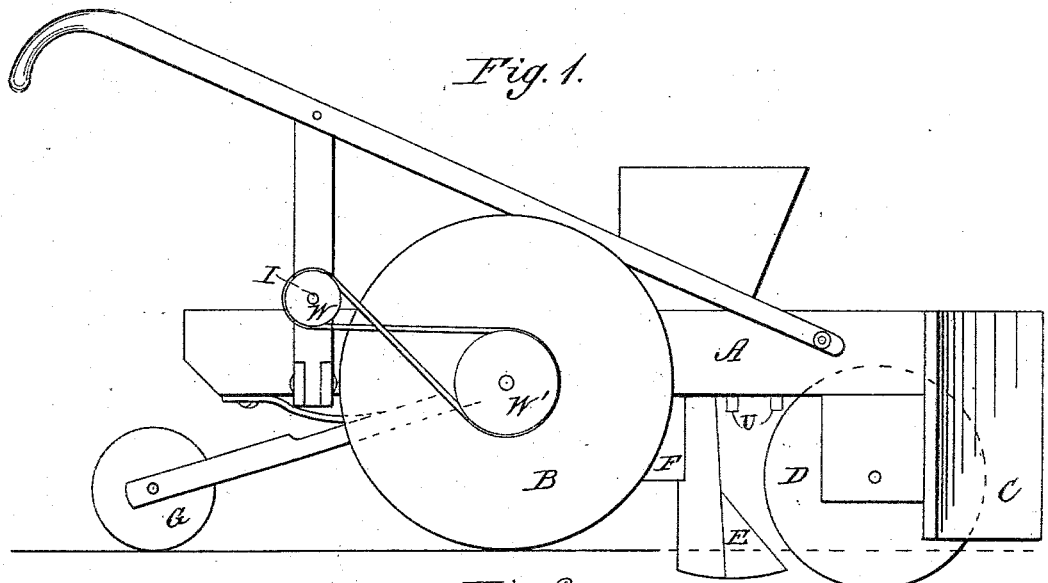
Fig. 1.
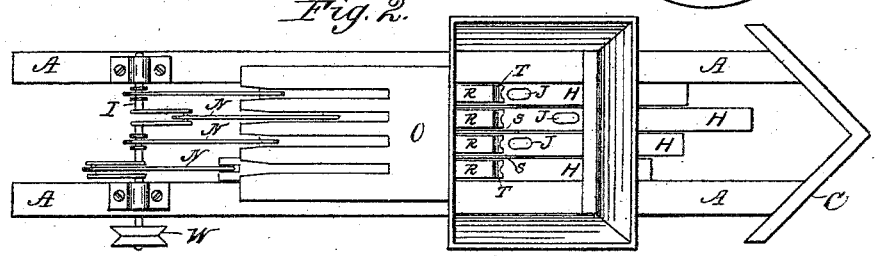
Fig. 2.
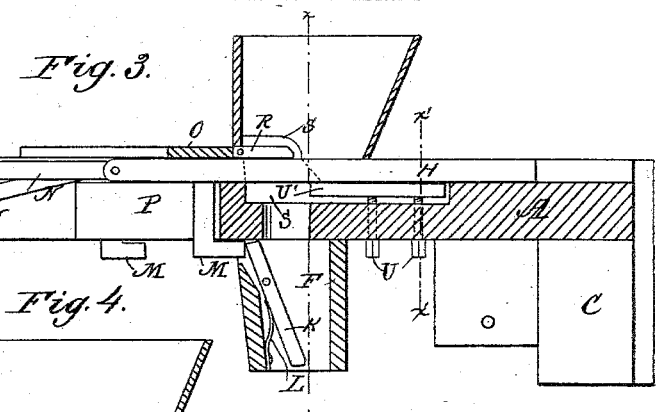
Fig. 3.
Fig. 5.
Fig. 4.
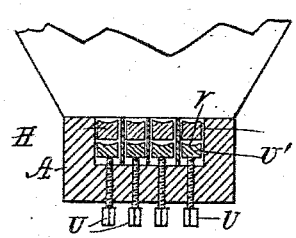
WITNESSES:
W. W. Hollingsworth
A. G. Lyne
INVENTOR:
C. C. Boykin
BY Munn & Co
ATTORNEYS.

UNITED STATES PATENT OFFICE.

CHRISTOPHER C. BOYKIN, OF IVOR, VIRGINIA, ASSIGNOR OF FOUR-NINTHS TO THOMAS F. BOYKIN, OF SAME PLACE.

PEANUT-PLANTER.

SPECIFICATION forming part of Letters Patent No. 301,664, dated July 8, 1884.

Application filed September 21, 1883. (No model.)

*To all whom it may concern:*

Be it known that I, CHRISTOPHER C. BOYKIN, of Ivor, in the county of Southampton and State of Virginia, have invented a new and useful Improvement in Peanut-Planters, of which the following is a full, clear, and exact description, reference being had to the annexed drawings, forming part of this specification.

This invention relates to wheeled planters for planting peanuts, peas, or other seeds; and the invention consists of the novel construction hereinafter described and claimed.

In the drawings, Figure 1 is a side elevation of my improved peanut-planter. Fig. 2 is a plan view of the dropping mechanism and its supporting-beams. Fig. 3 is a longitudinal section, and Fig. 4 is a transverse section, of the same; and Fig. 5 is a section on line $x'\ x'$ of Fig. 3.

A indicates two parallel beams, which are to be supported on a pair of wheels, B. At the forward ends of the beams are two laterally-inclined boards, forming a scraper, C, for smoothing the ridge in which the nuts are to be planted, and just behind the scraper is a revolving cutter, D, for clearing the way for the opener E, and preventing it from becoming clogged with weeds or trash. As the nuts drop into the furrow through the chute F the soil is pressed inward to fill the furrow by means of the wheels B, which are arranged quite close together, and the peripheral surfaces of which incline inward toward each other. A spring-pressed roller, G, at the rear of the planter is adapted to pack the soil to the nuts.

The dropping mechanism is located between the beams A, and consists of four slides, H, (more or less may be used,) connected to the shaft I, which is bent to form four differently-arranged cranks for operating the slides independently. The slides are provided with a cup or opening, J, at equal distances from their ends, to receive the nuts, one at a time, and convey them to the chute F, the cups being adapted to discharge one by one in regular order. The upper part of the chute is formed in compartments corresponding to the number of slides, and in each compartment is pivoted a valve, K, which is provided with a retaining-spring, L, adapted to cause the valve to retain the nuts at a position near the furrow, so that when they are dropped from the valves by means of the projections M on the slides coming in contact with the upper ends of the valves, and thus causing them to oscillate, they will not bounce out of the furrow. The connecting-rods N of the slides and the projections M are adapted to move in slotted guides O P, arranged above and below the slides, respectively. Each slide is provided with a longitudinal groove, Q, in its upper surface, to receive the peanuts and guide them into the openings J.

To cut off the nuts or seeds in the hopper from those received into the openings J, a guard, R, is pivoted above each slide between vertical guide-plates S, in such manner that they will yield sufficiently, when necessary, to prevent crushing any of the nuts that may be drawn against them by the cups or openings J. These guards are made with bevels T at their ends and grooves T' in their under surfaces, to facilitate their action. Underneath the slides is supported in an adjustable manner, by screws U, a plate or plates, U', having grooves V, corresponding to the openings J. The object of this plate is to regulate the quantity of nuts or seeds taken up by the slides. By lowering or raising the plate U' the cups or openings J will be made deeper or shallower, as may be desired, so that they will hold more or less seeds. The shaft I is provided with a pulley, W, which is belted to a pulley, W', on one of the wheels B, to give the required motion to the slides.

Instead of the guards R, springs made fast at one end may be used, and in such case the guide-plates S may be omitted.

To regulate the depth of furrow, the scraper C is to be set higher or lower, as may be required, and to regulate the distance between the hills planted, larger or smaller pulleys are to be used for driving the dropping mechanism.

What I claim is—

1. The combination, with the slides H, having cups J, of the adjustable plates U', supported under the slides, and adapted to be set nearer to or farther from the same, to regulate the capacity of the cups, substantially as shown and described.

2. The combination of the slides having cups or openings J, and provided with grooved upper surfaces, the adjustable plates U', for regulating the depth of the cups, the grooved and beveled guards R, pivoted between vertical guide-plates, the spring-actuated valves K, the projections M, attached to the slides, and means for operating the slides, substantially as shown and described.

CHRISTOPHER C. BOYKIN.

Witnesses:
   SOLON C. KEMON,
   CHAS. A. PETTIT.